United States Patent
Purdy et al.

(10) Patent No.: US 6,988,225 B1
(45) Date of Patent: Jan. 17, 2006

(54) VERIFYING A FAULT DETECTION RESULT BASED ON A PROCESS CONTROL STATE

(75) Inventors: Matthew A. Purdy, Austin, TX (US); Richard J. Markle, Austin, TX (US); Timothy L. Jackson, Pflugerville, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 532 days.

(21) Appl. No.: 10/285,003

(22) Filed: Oct. 31, 2002

(51) Int. Cl.
*G06F 11/00* (2006.01)

(52) U.S. Cl. ........................ 714/49; 700/108
(58) Field of Classification Search ............... 714/49, 714/50, 51, 47; 700/108, 90, 109, 177; 438/5, 438/8
See application file for complete search history.

(56) References Cited

U.S. PATENT DOCUMENTS

| | | | |
|---|---|---|---|
| 6,678,570 B1 * | 1/2004 | Pasadyn et al. | 700/109 |
| 6,721,616 B1 * | 4/2004 | Ryskoski | 700/108 |
| 6,740,534 B1 * | 5/2004 | Adams et al. | 438/14 |
| 6,871,114 B1 * | 3/2005 | Green et al. | 700/175 |
| 2005/0114078 A1 * | 5/2005 | Srinivasan et al. | 702/179 |

\* cited by examiner

*Primary Examiner*—Nadeem Iqbal
(74) *Attorney, Agent, or Firm*—Williams Morgan & Amerson, P.C.

(57) ABSTRACT

A method and an apparatus are provided for verifying a fault detection result in a system. The apparatus includes an interface and a control unit. The interface is adapted to receive data associated with a process operation and adapted to receive information provided by a process controller associated with the process operation. The control unit, which is communicatively coupled to the interface, is adapted to perform a fault detection analysis based on the data associated with the process operation and verify a result of the fault detection analysis based on the information provided by the process controller.

28 Claims, 3 Drawing Sheets

VERIFYING A FAULT DETECTION RESULT BASED ON A PROCESS CONTROL STATE

BACKGROUND OF THE INVENTION

1. Field of the Invention

This invention relates generally to a semiconductor fabrication process, and, more particularly, to verifying fault detection results in the semiconductor fabrication process based on process control states.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial improvements.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an Advanced Process Control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, particle contamination, film optical properties, film thickness, film uniformity, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology data to attempt to achieve post-processing results as close to a target value as possible. Reducing variation in this manner leads to increased throughput, reduced cost, higher device performance, etc., all of which equate to increased profitability.

Semiconductor manufacturing systems have become more reliable and robust over the past few years. However, as these semiconductor manufacturing systems become more sophisticated, the task of monitoring the semiconductor processes in these systems for the purposes of detecting faults becomes increasingly difficult. Thus, it is not unusual for a fault detection system to provide incorrect results, such as providing a "false positive" fault indication when no actual fault may have occurred or providing a "false negative" fault indication when a fault may have in fact occurred.

The present invention is directed to overcoming, or at least reducing the effects of, one or more of the problems set forth above.

SUMMARY OF THE INVENTION

In one embodiment of the present invention, a method is provided for verifying a fault detection result in a system. The method includes providing data associated with a processing of the at least one workpiece to a fault detection unit, wherein the processing is capable of being adjusted by a process controller, the process controller having a state value associated with the processing of the at least one workpiece. The method includes providing control information associated with the state value of the process controller to the fault detection unit and performing a fault detection analysis based on the data associated with the processing of the at least one workpiece. The method further includes verifying a result of the fault detection analysis based on the control information provided to the fault detection unit.

In another embodiment of the present invention, an apparatus is provided for verifying a fault detection result in a system. The apparatus includes an interface and a control unit. The interface is adapted to receive data associated with a process operation and adapted to receive information provided by a process controller associated with the process operation. The control unit, which is communicatively coupled to the interface, is adapted to perform a fault detection analysis based on the data associated with the process operation and verify a result of the fault detection analysis based on the information provided by the process controller.

In a further embodiment of the present invention, an article comprising one or more machine-readable storage media containing instructions is provided for verifying a fault detection result in a system. The one or more instructions, when executed, enable the processor to receive data associated with a process operation, receive information provided by a process controller associated with the process operation, perform a fault detection analysis based on the data associated with the process operation, verify a result of the fault detection analysis based on the information provided by the process controller.

In a further embodiment of the present invention, a system is provided for verifying a fault detection result. The system comprises a processing tool, a process controller, and a fault detection unit. The processing tool is adapted to provide data associated with processing of one or more workpieces. The process controller is adapted to provide control information to the processing tool and to determine a control state associated with the processing of the one or more workpieces. The fault detection unit is adapted to perform a fault detection analysis based on the data associated with the process operation and verify a result of the fault detection analysis based on the control state associated with the processing of the one or more workpieces.

BRIEF DESCRIPTION OF THE DRAWINGS

The invention may be understood by reference to the following description taken in conjunction with the accompanying drawings, in which like reference numerals identify like elements, and in which.

Figure 1:
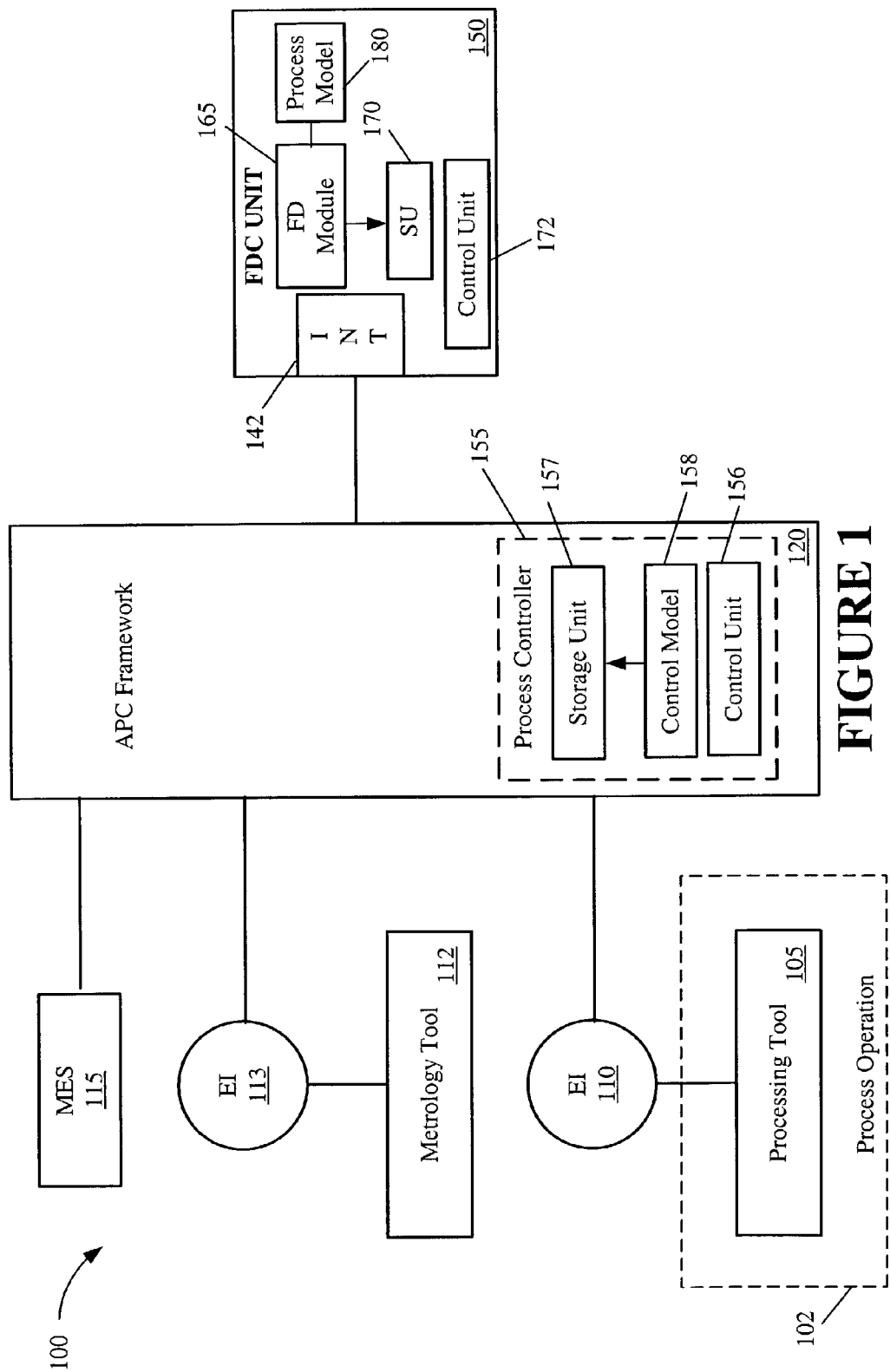
FIG. 1 illustrates a processing system, including an APC framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a system 100 is illustrated, in accordance with one embodiment of the present invention. The system 100, in the illustrated embodiment, includes at least one process operation 102 for implementing an industrial process, such as a semiconductor fabrication process, a photographic process, a chemical process, or any other process in which a plurality of variables, such as temperature, tool parameters, pressure level and chemical compositions, and the like may be monitored and analyzed. The variables may be monitored and analyzed, for example, to detect faults and/or classify the detected faults.

In the system 100, the process operation 102 may be performed using one or more processing tools 105. Generally, the particular type of process operation 102 that is performed, and the type of processing tool(s) 105 employed in that process operation 102, depends on the particular implementation. For example, in the context of a chemical industrial process, the process operation 102 may include processing a polymer. In the context of a photographic process, the process operation 102 may, for example, include processing a film.

For illustrative purposes, the process operation 102 depicted in FIG. 1 is at least a portion of a semiconductor fabrication process, which, for example, may be part of an overall semiconductor process flow. The processing tool 105, in the illustrated embodiment, may take the form of any semiconductor fabrication equipment used to produce a processed workpiece, such as a silicon wafer. The semiconductor process may be utilized to produce a variety of integrated circuit products including, but not limited to, microprocessors, memory devices, digital signal processors, application specific integrated circuits (ASICs), or other similar devices. An exemplary processing tool 105 may include an exposure tool, an etch tool, a deposition tool, a polishing tool, a rapid thermal anneal processing tool, a test-equipment tool, an ion implant tool, a packaging tool and the like.

In the system 100 of FIG. 1, the processing tool 105 has an associated equipment interface 110, and a metrology tool 112 has an associated equipment interface 113, for interfacing with an Advanced Process Control (APC) framework 120. In the illustrated embodiment, the metrology tool 112 measures aspects of the workpieces (e.g., wafers) that are processed in the process operation 102. The metrology tool 112, in one embodiment, may be capable of measuring aspects of the workpieces off-line, in-line, in situ or a combination thereof.

The manufacturing system 100 may include a manufacturing execution system (MES) 115 that is coupled to the APC frame work 120. The manufacturing execution system 115 may, for example, determine the processes that are to be performed by the processing tool 105, when these processes are to be performed, how these processes are to be performed, etc. In the illustrated embodiment, the manufacturing execution system 115 manages and controls the overall system through the APC framework 120.

An exemplary APC framework 120 that may be suitable for use in the manufacturing system 100 may be implemented using the Catalyst system offered by KLA-Tencor, Inc. The Catalyst system uses Semiconductor Equipment and Materials International (SEMI)° Computer Integrated Manufacturing (CIM) Framework compliant system technologies and is based on the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI, which is headquartered in Mountain View, Calif.

The APC framework 120 includes a process controller 155 that, through a feedback process, aids the processing tool 105 towards performing a desired process to thereby achieve a desired result. In accordance with one or more embodiments of the present invention, and as described in greater detail below, the process controller 155 is utilized to verify (or validate) fault detection results provided by a fault detection and classification (FDC) unit 150. The process controller 155 in the illustrated embodiment includes a control unit 156 and a storage unit 157.

The process controller 155 receives data from the metrology tool 112 via the associated equipment interface 113 and adjusts the operating recipe of the processing tool 105 to reduce variations in the characteristics of the workpieces that are processed by the processing tool 105. The particular control actions taken by the process controller 155 depend on the particular processes performed by the processing tool 105, and the output characteristic measured by the metrology tool 112.

The process controller 155 uses at least one control model 158 to generate a control action for the processing tool 105. The control model 158, which may be stored in the storage unit 157, may be developed empirically using commonly known linear or non-linear techniques. The control model 158 may be a relatively simple equation-based model (e.g., linear, exponential, weighted average, etc.) or a more complex model, such as a neural network model, principal component analysis (PCA) model, partial least squares projection to latent structures (PLS) model, or the like. The specific implementation of the control model 158 may vary depending on the modeling techniques selected and the process being controlled. The process controller 155, in one embodiment, maintains incoming "state" information associated with the process operation 102, where the "state" information may be based at least in part on the characteristics (i.e., wafer state) of the wafer selected for gathering metrology data and/or state information known about the controlled processing tool 105 (i.e., tool state).

In the illustrated embodiment, the process controller 155 is a computer programmed with software to implement the functions described. However, as will be appreciated by those of ordinary skill in the art, a hardware controller designed to implement the particular functions may also be used. Moreover, the functions performed by the process controller 155, as described herein, may be performed by multiple controller devices distributed throughout a system. Additionally, the process controller 155 may be a stand-alone controller, resident in the processing tool 105, or part of a system controlling operations in an integrated circuit manufacturing facility.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

In the illustrated embodiment, the FDC unit 150 is coupled to the APC framework 120 via an interface 142. The interface 142 may be any acceptable structure(s) that allow(s) the FDC unit 150 to communicate with other devices. The FDC unit 150 may include a fault detection (FD) module 165 that is storable in a storage unit (SU) 170. The FDC unit 150 includes a control unit 172 for managing overall operations and executing one or more software applications resident in the storage unit 170.

In the illustrated embodiment, the FDC unit 150 includes a process model 180 that is employed by the FD module 165 to detect occurrences of faults associated with the process operation 102. In one embodiment, the process model 180 is generated using history data that was previously collected from the same or other similar-type tools. In one embodiment, principal component analysis (PCA) may be performed on the history data. Principal component analysis, a well-known technique to those skilled in the art, involves a mathematical procedure that transforms a number of (possibly) correlated variables into a (smaller) number of uncorrelated variables called principal components. The first principal component accounts for as much of the variability in the data as possible, and each succeeding component accounts for as much of the remaining variability as possible. While the illustrated embodiment utilizes a model based on PCA, in other embodiments, the process model 180 may be based on any suitable mathematical procedure.

Faults may occur in the process operation 102 for various reasons, including occurrence of an unknown disturbance, hardware failure, depletion of resources (e.g., gases, liquids, chemicals), variations in incoming materials or workpieces and the like. The faults may be detected in several ways. One way is to compare processing data that is associated with the process operation 102 to the process model 180. The data provided by the process operation 102 may include substantially real-time data (sometimes referred to as "trace data") or (in-line/off-line/in situ) metrology data, or both trace and metrology data.

In the illustrated embodiment, the FD module 165 is implemented in software, and, as such, is stored in the storage unit 170 of the FDC unit 150. In other embodiments, the FD module 165 may be implemented in hardware or firmware. For illustrative purposes, the FD module 165 and process model 180 are shown resident in the FDC unit 150, although it should be noted that the FD module 165 and the process model 180 may be implemented in any suitable component of the manufacturing system 100, including in the APC framework 120. In one embodiment, the FD module 165 and the process model 180 may be implemented as a standalone unit, for example, in a data processing unit or computer.

It should be understood that the illustrated components shown in the block diagram of the system 100 in FIG. 1 are illustrative only, and that, in alternative embodiments, additional or fewer components may be utilized without deviating from the spirit or scope of the invention. For example, in one embodiment, the MES 115 may interface with the APC framework 120 through an associated equipment interface. Additionally, it should be noted that although various components, such as the equipment interface 110 of the system 100 of FIG. 1 are shown as stand-alone components, in alternative embodiments, such components may be integrated into the processing tool 105. Similarly, the FDC unit 150 may be integrated into the APC framework 120. Additionally, the storage unit 170 of the FDC unit 150 may be located at any suitable location in the manufacturing system 100 such that various components of the manufacturing system 100 can access the contents stored therein.

Figure 2:
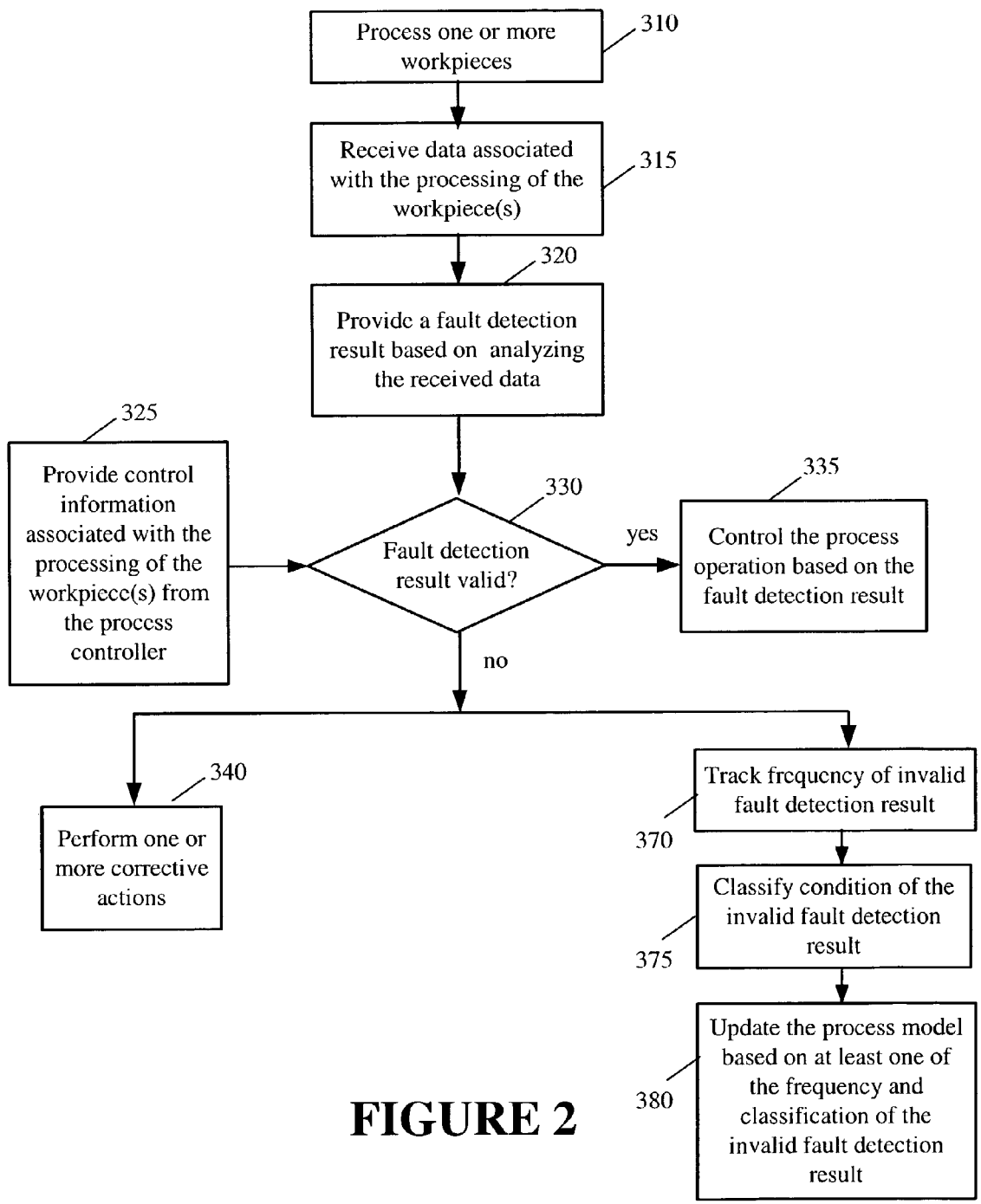
FIG. 2 illustrates a flow diagram of a method that may be implemented in the system of FIG. 1, in accordance with one embodiment of the present invention.

Referring now to FIG. 2, a flow diagram of a method that may be implemented in the manufacturing system 100 of FIG. 1 is illustrated, in accordance with one embodiment of the present invention. The processing tool 105 of the process operation 102 processes (at 310) one or more workpieces.

As the workpieces(s) are processed and/or after the completion of the processing, a variety of variables may be measured and provided to the FDC unit 150. The types of variables that are measured may vary with the particular type of processing tool 105 that is employed in the process operation 102. Measurements in a furnace tool, for example, may be associated with gas flow rates, chamber pressure, chamber temperature, processing time, operating condition of the heating elements, and operating conditions of other various components of the processing tool 105, and the like. As an additional example, in a polishing tool, the measurements may be related to polish time, downforce, polishing pad speed, motor current, polishing arm oscillation magnitude and frequency, slurry chemical composition, temperature inside the tool, and operating conditions of various components of the polishing tool. Similarly, in other embodiments, various other variables may be measured and provided to the FDC unit 150. In one embodiment, the above-noted exemplary measurements may be provided in substantially real-time in the form of "trace data."

In one embodiment, apart from trace data, metrology data may also be collected by the metrology tool 112 (see FIG. 1) and provided to the FDC unit 150. The metrology data may include measurements of various characteristics of the processed workpiece(s). In one embodiment, the metrology data may be collected in-line, off-line, in situ or a combination thereof, depending on the implementation.

The FDC unit 150 receives (at 315) the collected data (e.g., trace and/or metrology data) associated with the processing tool 105 (or associated with the processing of the workpieces). The FDC unit 150 provides (at 320) a fault detection result based on analyzing the data received (at 315). The fault detection result may be an indication of an occurrence of a fault or it may be an indication that no fault was detected (i.e., the processing tool 105 is performing as desired according to the process model 180). In one embodiment, an occurrence of a fault may be determined by calculating an overall health value based on the collected data and a comparison of the collected data to the process model 180 (see FIG. 1). A relatively low overall health value may, for example, indicate that the processing tool 105 is experiencing faulty operation. On the other hand, a relatively high overall health value may be an indication that the processing tool 105 is operating within an acceptable limit (or as desired).

As noted earlier, the process controller 155 (see FIG. 1) adjusts the operating recipe of the processing tool 105 to reduce variations in the characteristics of the workpieces that are processed by the processing tool 105. In accordance with one embodiment of the present invention, the process controller 155 also provides (at 325) control information to the FDC unit 150. In the one embodiment, the control information indicates whether the process operation 102 under the control of the process controller 155 is operating within an acceptable limit (or as desired) based on one or more of the control states of the process controller 155.

The process controller 155, in one embodiment, calculates one or more control states that are indicative of the performance of the process operation 102. The particular type of control state(s) calculated depends on the particular implementation. For example, in the context of a deposition process operation, the deposition rate may be an exemplary control state that is calculated based on measuring the thickness of the material deposited divided by the time during which it was deposited. In the context of an etching process operation, the etch rate may be an exemplary control state that is calculated based on etching depth divided by the etch time. Similarly, in other embodiments, a variety of control state(s) may be calculated. In one embodiment, the control state(s) may be calculated on a lot-to-lot basis.

Upon calculating the control state(s), the process controller 155 may determine the control information based on determining if the calculated control state(s) is/are within an acceptable range (i.e., the control state(s) is/are indicative of normal or acceptable operation). This may be accomplished in several ways. If the process operation 102 is relatively drift free (i.e., little or no process variations occur from one lot to another, for example), then the control state(s) may be compared to a threshold value(s) that is/are representative of acceptable performance. In one embodiment, if the control state is within a selected percentage amount of the threshold value, then that is an indication that the control state is within an acceptable range. In another embodiment, the control state(s) may be compared to the control model 158 to determine if the control state(s) are within an acceptable range.

As noted, the control information provided by the process controller 155 to the FDC unit 150 indicates whether the control state(s) of the process controller 155 is/are within an acceptable range. In an alternative embodiment, instead of the process controller 155, the FDC unit 150 may determine the control information based on the control state(s) of the process controller 155.

The FD module 165 of the FDC unit 150 determines (at 330) whether the fault detection result (at 320) is valid. In the illustrated embodiment, the FDC unit 150 validates (or verifies) the fault detection result based on the control information provided (at 325) by the process controller 155. The fault detection result provided by the FDC unit 150 may be invalid for at least two reasons—a fault is indicated when no fault exists (i.e., a "false positive" fault) or no fault is detected where one exists (i.e., a "false negative" fault). If the fault detection result indicates an occurrence but the control information indicates that the control state(s) of the process controller 155 is/are within an acceptable range, then that is an indication that the fault detection result is not valid (i.e., even though the fault detection result indicates a fault, the process operation 102 is operating as desired). The above illustration is an example of a "false positive" fault, where a fault is detected even though the process operation 102 is operating as desired. If the fault detection result indicates that the process operation 102 is performing as desired (i.e., an indication that no fault has occurred) but the control information indicates that the control state(s) of the process controller 155 is/are outside an acceptable range, then that is an indication that a fault associated with the process operation 102 has occurred. This above description is an example of a "false negative" fault, where no fault is detected with a process operation 102 that is not functioning as desired.

If the FD module 165 determines (at 330) that the fault detection result (at 320) is valid, the FDC unit 150 controls (at 335) the process operation 102 based on the fault detection result. That is, if the fault detection result indicates that the process operation 102 is processing as desired (i.e., no fault is detected), and it is determined (at 330) that the fault detection result (at 320) is valid, then the process operation 102 is allowed to continue processing the workpieces. If, however, the fault detection result indicates that a fault associated with the process operation 102 has occurred and it is determined (at 330) that the fault detection result (at 320) is valid, then, in one embodiment, the process operation 102 may be halted until corrective action is taken to remove the faulty condition.

If the FD module 165 determines (at 330) that the fault detection result (at 320) is not valid, then, in one embodiment, one or more corrective actions are performed (at 340). The fault detection result may not be valid for a variety of reasons described above. For example, the FDC unit 150 may indicate a "false positive" fault even though the process operation 102 is operating as desired. As an additional example, the FDC unit 150 may indicate a "false negative" fault even though the process operation 102 is not operating as desired.

Figure 3:
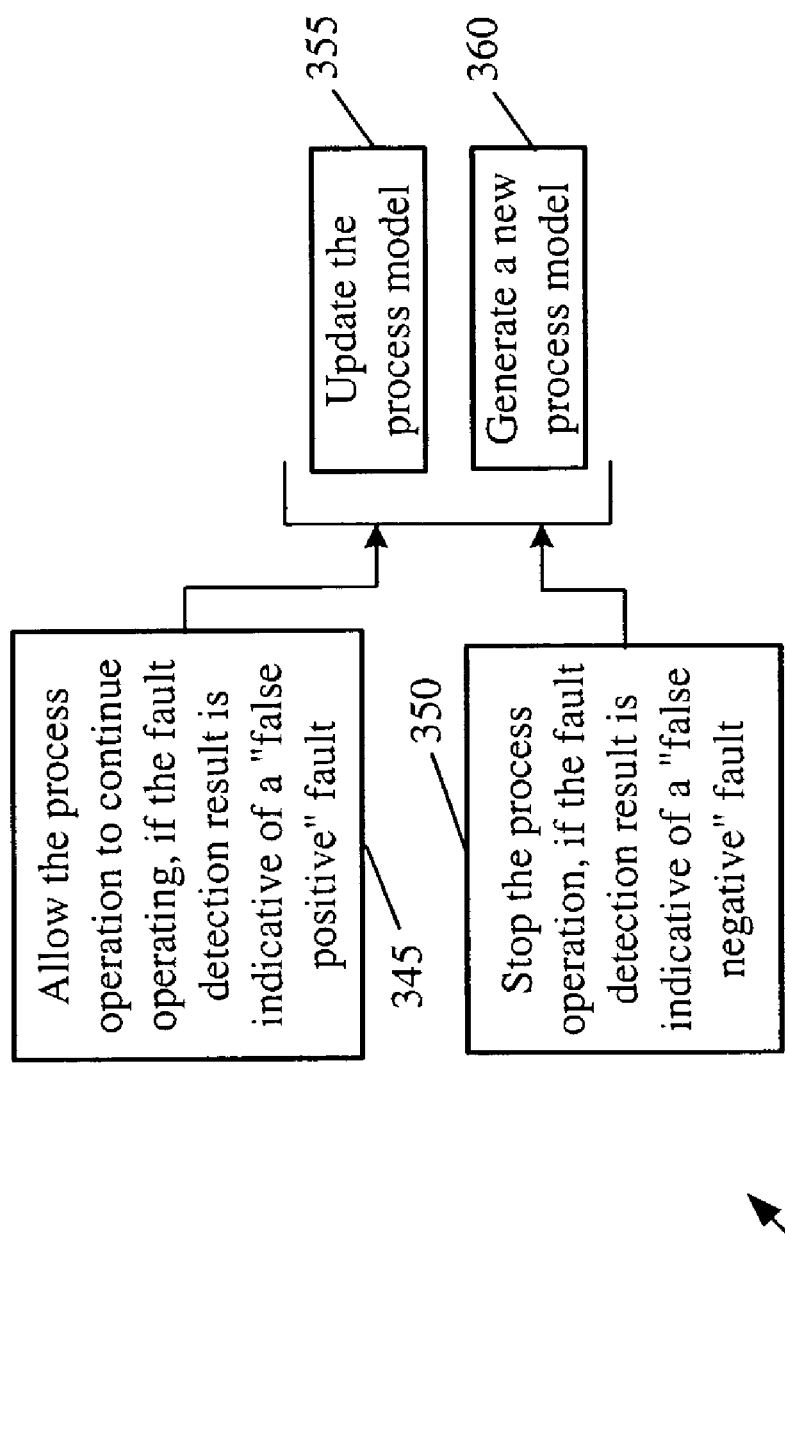
FIG. 3 illustrates an alternative embodiment of a flow diagram of the method of FIG. 1, in accordance with one embodiment of the present invention.

As illustrated in FIG. 3, the corrective action performed (at 340) may depend on the reason the fault detection result is determined to be invalid. For example, if the fault detection result (at 320) (of FIG. 2) is determined to be a "false positive" fault (i.e., a fault was detected even though the process operation 102 is operating as desired), then the process operation 102 is allowed (at 345) to continue (as opposed to being halted because a fault was detected). If the fault detection result (at 320) is determined to be a "false negative" fault (i.e., no fault was detected even though the process operation 102 is not operating as desired), then the process operation 102 is stopped (at 350) until corrective action may be taken. One advantage of stopping the process operation 102 (at 350) is to reduce the number of resources that may be wasted as a result of faulty process operation 102.

In one embodiment, if the fault detection result is found not to be valid (at 330), then it may be desirable to revise the process model 180 (see FIG. 1) to improve the overall fault detection process as part of the corrective action (at 340). As shown in FIG. 3, performing the corrective action (at 340) may include updating (at 355) the process model 180 of the FDC unit 150. The process model 180 may be updated based on at least a portion of the data received (at 315) by the FDC unit 150. Updating the process model 180 may reduce the occurrences of subsequent "false positive" fault indications. In another embodiment, a new process model 180 may be generated (at 360), where the new process model 180 may more accurately reflect the performance of the process operation 102. Once a new process model 180 is generated, the previous version of the process model 180 may be discarded thereafter.

Referring again to FIG. 2, if the FD module 165 determines (at 330) that the fault detection result (at 320) is not valid, then, in one embodiment, the FDC unit 150 tracks (at 370) the number or occurrences (or the frequency) of the invalid fault detection result. That is, in one embodiment, the FDC unit 150 maintains a record of the number of times a particular type of "false positive" or "false negative" fault occurred previously. In one embodiment, the invalid fault detection result is classified (at 375). The classification of the invalid fault detection result may include categorizing the detected faults according to the condition of the process controller 155 in view of the control information provided (at 325).

Based on at least one of the frequency and classification of the invalid fault detection result, the FDC unit 150 updates (at 380) the process model 180. In one embodiment, the number of occurrences of a particular fault detection result (e.g., a "false positive" fault or "false negative result") and/or the classification of that invalid fault detection result may aid in improving the process model 180.

One or more embodiments of the present invention may result in increased profitability in the system 100 of FIG. 1 for a variety of reasons. For example, one embodiment of the present invention allows the process operation 102 to continue functioning by distinguishing "false positive" faults from true faults, thereby reducing the downtime. A reduction in downtime can result in increased profitability because of an increased throughput, as the process operation 102 can operate for longer times without interruptions. Embodiments of the present invention can also increase profitability by timely detecting faults that may otherwise be missed by the FDC unit 150 (i.e., "false negative" faults). Failing to timely identifying faults can result in loss of valuable resources (e.g., wafers, supplies needed to process the wafers, time, and the like), which reduces the overall profitability.

The various system layers, routines, or modules may be executable by the control unit 156, 172 (see FIG. 1). As utilized herein, the term "control unit" may include a microprocessor, a microcontroller, a digital signal processor, a processor card (including one or more microprocessors or controllers), or other control or computing devices. The storage unit 157, 170 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
providing data associated with processing of at least one workpiece to a fault detection unit, wherein the processing is capable of being adjusted by a process controller, the process controller having a state value associated with the processing of the at least one workpiece;
providing control information associated with the state value of the process controller to the fault detection unit;
performing a fault detection analysis based on the data associated with the processing of the at least one workpiece; and
verifying a result of the fault detection analysis based on the control information provided to the fault detection unit.

2. The method of claim 1, wherein providing the data comprises providing at least one of trace data and metrology data to the fault detection unit.

3. The method of claim 1, wherein the result comprises detection of an occurrence of a fault associated with the processing of the at least one workpiece, and wherein verifying the result comprises determining if the detected fault is a false positive fault.

4. The method of claim 1, wherein verifying the result comprises identifying a false negative fault.

5. The method of claim 1, wherein providing the control information comprises indicating whether the state value is indicative of normal operation.

6. The method of claim 5, wherein indicating whether the state value is indicative of normal operation comprises comparing the state value to a control model, wherein the control model is based on history data.

7. The method of claim 1, the process controller having a plurality of state values associated with the processing of the at least one workpiece, wherein the control information is based on the plurality of the state values.

8. The method of claim 1, wherein verifying the result comprises determining if the result is valid.

9. The method of claim 8, further comprising performing a corrective action based on determining that the result is not valid.

10. The method of claim 9, wherein performing the fault detection analysis comprises comparing the data to a process model and wherein performing the corrective action comprises at least one of updating the process model and generating a new process model.

11. The method of claim 1, further comprising:
determining a number of times the result of the fault detection analysis is invalid;
classifying the result of the fault detection analysis based on the control information;
updating a process model based on at least one of the number of times the result is invalid and the classification of the result.

12. An apparatus, comprising:
an interface adapted to receive data associated with a process operation and adapted to receive information provided by a process controller associated with the process operation; and
a control unit communicatively coupled to the interface, the control unit adapted to:
perform a fault detection analysis based on the data associated with the process operation; and
verify a result of the fault detection analysis based on the information provided by the process controller.

13. The apparatus of claim 12, wherein the control unit is adapted to perform the fault detection analysis based on at least one of trace data and metrology data.

14. The apparatus of claim 12, wherein the result comprises detection of a fault associated with the process operation, and wherein the control unit is adapted to indicate if the detected fault is a false positive fault.

15. The apparatus of claim 12, wherein the control unit is adapted to indicate a false negative fault.

16. The apparatus of claim 12, wherein the information provided by the process controller is representative of a control state of the process controller.

17. The apparatus of claim 12, wherein the control unit is adapted to determine if the result is valid and to perform a corrective action in response to determining that the result is not valid.

18. The apparatus of claim 17, wherein the control unit is adapted to perform the fault detection analysis based on comparing the received data to a process model.

19. The apparatus of claim 18, wherein the control unit is adapted to at least one of update the process model and generate a new model based on determining that the result is not valid.

20. An apparatus, comprising:
means for receiving data associated with a process operation;
means for receiving information provided by a process controller associated with the process operation;
means for performing a fault detection analysis based on the data associated with the process operation; and
means for verifying a result of the fault detection analysis based on the information provided by the process controller.

21. An article comprising one or more machine-readable storage media containing instructions that when executed enable a processor to:
receive data associated with a process operation;
receive information provided by a process controller associated with the process operation;
perform a fault detection analysis based on the data associated with the process operation; and
verify a result of the fault detection analysis based on the information provided by the process controller.

22. The article of claim 21, wherein the instructions when executed enable the processor to perform the fault detection analysis based on at least one of trace data and metrology data.

23. The article of claim 21, wherein the instructions when executed enable the processor to verify if a detected fault is a false positive fault.

24. The article of claim 21, wherein the instructions when executed enable the processor to verify a presence of a false negative fault.

25. The article of claim 21, wherein the instructions when executed enable the processor to verify the result based on comparing the information provided by the process controller to a preselected threshold value.

26. The article of claim 21, wherein the instructions when executed enable the processor to verify the result based on comparing the information provided by the process controller to a control model that is based on history data.

27. A system, comprising:
a processing tool adapted to provide data associated with processing of one or more workpieces;
a process controller adapted to provide control information to the processing tool and to determine a control state associated with the processing of the one or more workpieces; and
a fault detection unit adapted to:
perform a fault detection analysis based on the data associated with the process operation; and
verify a result of the fault detection analysis based on the control state associated with the processing of the one or more workpieces.

28. The system of claim 27, wherein an advanced process control framework is coupled between the processing tool and the fault detection unit.

* * * * *